United States Patent

Taylor

[15] 3,646,475
[45] Feb. 29, 1972

[54] VORTEX TUBE LASER
[72] Inventor: Francis M. Taylor, Xenia, Ohio
[73] Assignee: Systems Research Laboratories, Inc., Dayton, Ohio
[22] Filed: Sept. 16, 1969
[21] Appl. No.: 858,491

[52] U.S. Cl. ............................ 331/94.5, 62/5, 313/231
[51] Int. Cl. ................. H01s 3/09, H01s 3/22, F25b 9/02
[58] Field of Search ................... 331/94.5; 62/5; 313/231

[56] References Cited

UNITED STATES PATENTS 3,173,273  3/1965  Fulton ..................................... 62/5
3,496,489  2/1970  Lin ...................................... 331/94.5

OTHER PUBLICATIONS

Clark et al., "Performance Characteristics Argon," Nucl. Sci. Abstr. #10211 Vol. 15, No. 8, April 30, 1961, p. 1305.

*Primary Examiner*—Ronald L. Wibert
*Assistant Examiner*—R. J. Webster
*Attorney*—Kemon, Palmer & Estabrook

[57] ABSTRACT

A Hilsch-Ranque swirl tube is operated as a gas laser by injecting a mixture of hot gases therein at very high velocity.

9 Claims, 7 Drawing Figures

PATENTED FEB 29 1972 3,646,475

INVENTOR
FRANCIS M. TAYLOR

BY Kenyon, Palmer & Estabrook
ATTORNEYS

INVENTOR
FRANCIS M. TAYLOR

VORTEX TUBE LASER

BACKGROUND OF THE INVENTION

This invention relates to lasers and more particularly to gas lasers. In lasers employing the auxiliary gas pumping scheme, either one or both of two conditions occur. One of the auxiliary gases may be used to "pump" the energy into the upper laser level of the gas that is lasing. For this to occur there must exist a "matching" of an excited energy level of the auxiliary gas with the upper laser level of the lasing gas. When such an energy level match exists a collision between two such molecules, one of which is in the ground state and the other in one of the matched levels, can result in energy exchange with the two molecules trading states and the excess or deficient energy either carried away by or extracted from the kinetic energy of translation. The probability of such an exchange is proportional to exp. $(-\Delta E/kT)$ where $\Delta E$ is the energy difference between the two levels. Such exchange is also known as resonant transfer. In a gas laser employing such a process, the relative percentages of the gases are chosen so that the result of the process is that the upper energy level of the lasing gas becomes more highly populated than would be possible without the auxiliary gas. The same process working in reverse with an additional auxiliary gas may also be used to "pump" the energy out of the lower laser level, resulting in a lower population in that level. The two conditions may be used in combination to contribute to the population inversion in the two levels necessary for laser action.

The usual means of coupling the excitation energy into the various energy levels employed in gas lasers is through electron collision processes occurring in a plasma discharge. Referring to FIG. 1, the population inversion would be obtained in a system using auxiliary gases in the following manner:

1. Electron collision—exciting gas B to energy level $B_1$.
2. Resonant transfer—exciting gas A to energy level $A_1$, while simultaneously deexciting gas B back to ground.
3. Laser transition from $A_1$ to $A_2$.
4. Deexcitation of level $A_2$ by direct transition or by gas C.

While these are the basic processes involved in producing laser action in such a system, there are many additional processes going on in the plasma discharge which tend to either degrade or at least not contribute to the desired population inversion in gas A (i.e., $A_1$ greater than $A_2$). An often limiting problem is the populating of the lower laser level by direct electron collision processes. This is true whether the system is a single gas or an auxiliary system. A related problem in such undesired population buildup of the lower laser stage is that in many gas laser systems the transition probability for a radiative transition from this state to the ground state is low or near zero (i.e., a forbidden transition). Thus gas laser systems are often limited in power by the "piling up" of electrons (also known as radiation trapping) which goes on in either the lower laser level or in some other terminal lower level of the system. This means that some method other than radiative transition must be provided to permit the depopulation of the lower laser level if high output powers are to be attained. In a helium-neon laser, for instance, such depopulation is provided by wall collisions and an inverse dependence of power on tube diameter results. $CO_2$ lasers are also limited in this respect in spite of the fact that the terminal laser levels are to some degree radiatively connected to the ground state. The transition probabilities involved in radiatively depopulating the lower laser levels in a $CO_2$ laser are low enough that such trapping does occur. To overcome this problem, a three-gas system is often used in $CO_2$ lasers wherein either $H_2O$ or He is used for lower level depopulation. FIG. 2 shows the energy levels and energy flow paths for such a laser. A direct transition from the 100 level of $CO_2$ to the ground state or to levels $02_00$ and $01_10$ have low probability and do not readily occur. Note the fairly large energy difference that exists between the 100 and $02^10$, which are not radiatively connected to the ground state, and the $01^10$ level, which is radiatively connected to the ground state. This means that in collision processes between these levels an exchange of energies is not very likely due to the fairly large amount of energy that would have to be provided by or carried away by the kinetic energy of translation. $H_2$ or He function to connect the 100 $CO_2$ level to ground through the various paths shown in FIG. 2. The $H_2O$ level shown is fairly broad even at low temperatures and thus may interchange energy freely with all of the lower $CO_2$ levels. There is currently no firm agreement on the exact energy exchange processes that occur upon the addition of He other than that the effect is to lower the population in the lower laser level of the $CO_2$.

The energy flow scheme described above only remains valid as long as fairly low pressures and discharge currents are maintained. As pressure and/or discharge currents rise, the population distribution of the rotation-vibration levels approaches an equilibrium distribution wherein the low-lying levels are more densely populated than the higher lying levels: the exact opposite of the conditions necessary for a laser. This condition results from the combined effects of shorter mean-free path due to the high density of molecules and from the shorter time between collisions caused by the molecules, ions, and electrons being more energetic under higher currents. These combined effects cause more collisions per unit time, permitting the entire system to more nearly reach an equilibrium. In such a condition the levels are said to thermalize, or approach a distribution describable by a temperature. Such a thermal distribution is equivalent to the effect obtained by simple heating of the gas. Thus at high pressures and/or high temperatures resulting from high discharge currents, a $CO_2$ laser is also limited by population buildup in the lower laser levels. It appears then in general that in gas laser systems employing a plasma discharge there exist built-in limitations on the output power obtainable. In particular, the restriction to low pressures means that the number of amplifying centers in the media is limited, which produces a corresponding limitation in the output power, since such depends directly on the number of amplifying centers (which in turn are directly proportional to density or, for a gas at given temperature and volume, the pressure).

Calculations first performed by Patel for a $CO_2$—$N_2$ laser give an expected power out of 30 milliwatts per cubic centimeter per the product of the partial pressures of $CO_2$ and $N_2$. That is $$\frac{\text{Power Out}}{\text{Partial Pressures}} = \frac{30\ m\ \text{watts}}{CM^3 - P_{N_2} - P_{CO_2}}$$

This was for a population of the first excited vibrational level of $N_2$ equal to 20 percent of the total $N_2$ present. More recent data indicate that the specific values in this equation may not be accurate, but the general relation and dependence remains valid. As is apparent from the equation, pressure increases have the possibility of yielding much increased power outputs. However, increased pressures in a plasma discharge create other problems which are detrimental to the population inversion, thus this equation and the lasers it describes have been previously limited to pressures of not more than a few torr. Therefore, in order to achieve the potential of higher output powers by pressure increase (pressure increase being equivalent to an increase in the number of amplifying centers), an excitation method which eliminates the plasma discharge in the region of the laser cavity appears to be required.

Accordingly, it is the principal object of the present invention to provide a thermally excited gas laser which inherently permits depopulation of the lower laser level and simultaneous high population of the upper laser level and thus greatly increase the efficiency and power output of the device. The following description could apply to many different combinations of gases. The specific gas combinations to be used for illustrative purposes are $CO_2$—$N_2$, $CO_2$—$N_2$—$H_2O$, and $CO_2$—$N_2$—$He$ where the $CO_2$ is the lasing gas, the $N_2$ is the pump gas populating the upper laser level and the $H_2O$ or the He is the gas used to depopulate the lower laser level.

BRIEF SUMMARY OF THE INVENTION

In general, the objects of the invention are achieved by using the hot pressurized gases which normally comprise a laser to drive a vortex tube (also known as Hilsch, Ranque, Hilsch-Ranque, swirl tube). The basic U.S. patent on tubes of this type is Ranque, U.S. Pat. No. 1,952,281. Other more recently issued patents on this same subject matter are U.S. Pat. No. 3,173,273 of Mar. 16, 1965; and U.S. Pat. No. 3,208,279 of Sept. 28, 1965. Such a procedure permits a thermal excitation scheme to be combined with a unique cooling process whereby the lower laser level achieves a quite low population density while the upper lasing level is highly populated.

DETAILED DESCRIPTION OF THE INVENTION

Figure 1:
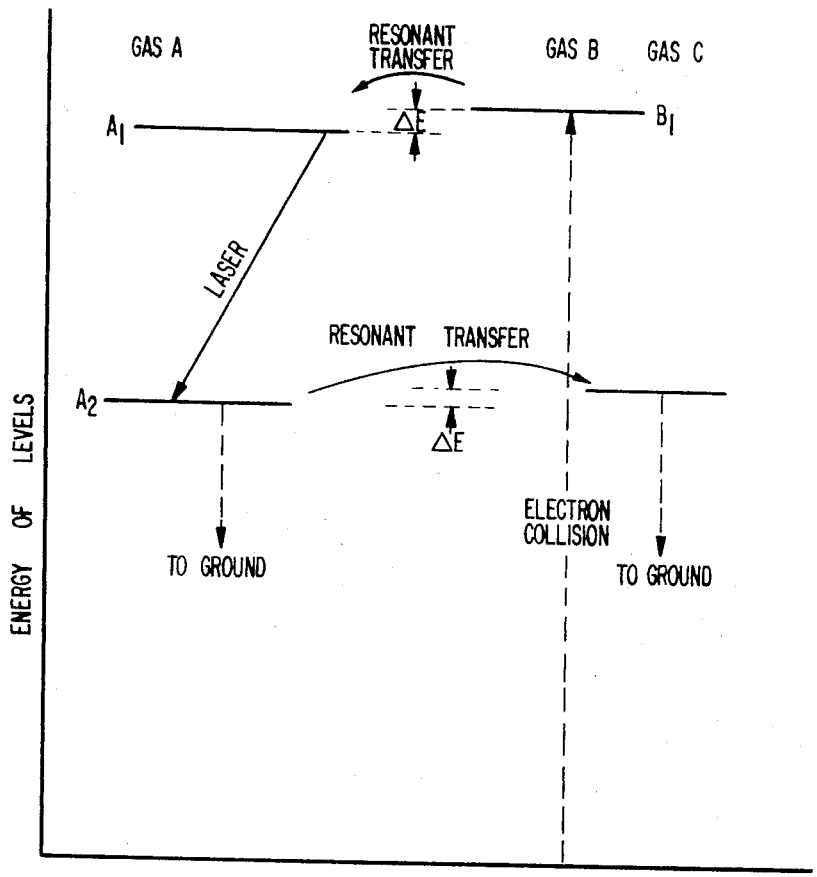
FIG. 1 is an energy diagram of a two or three gas laser utilizing the principal of electron collision in a plasma discharge.
Figure 3:
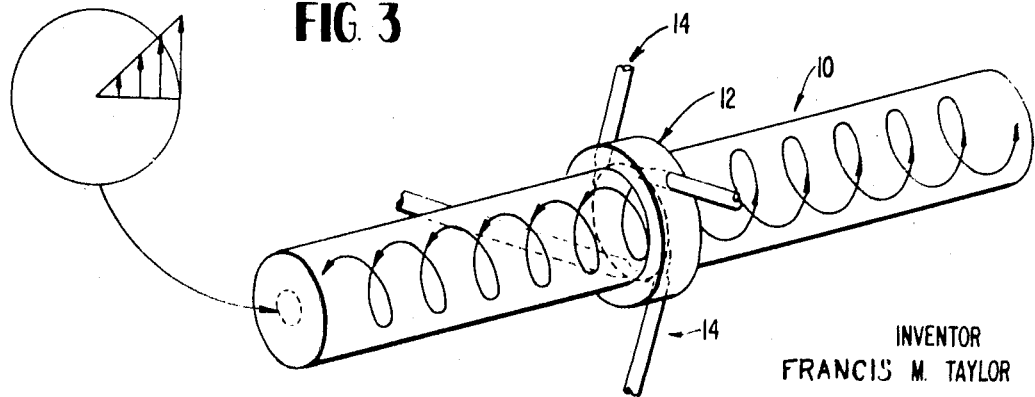
FIG. 3 is a diagrammatic view of a symmetric vortex tube having a single set of injection nozzles.
Figure 2:
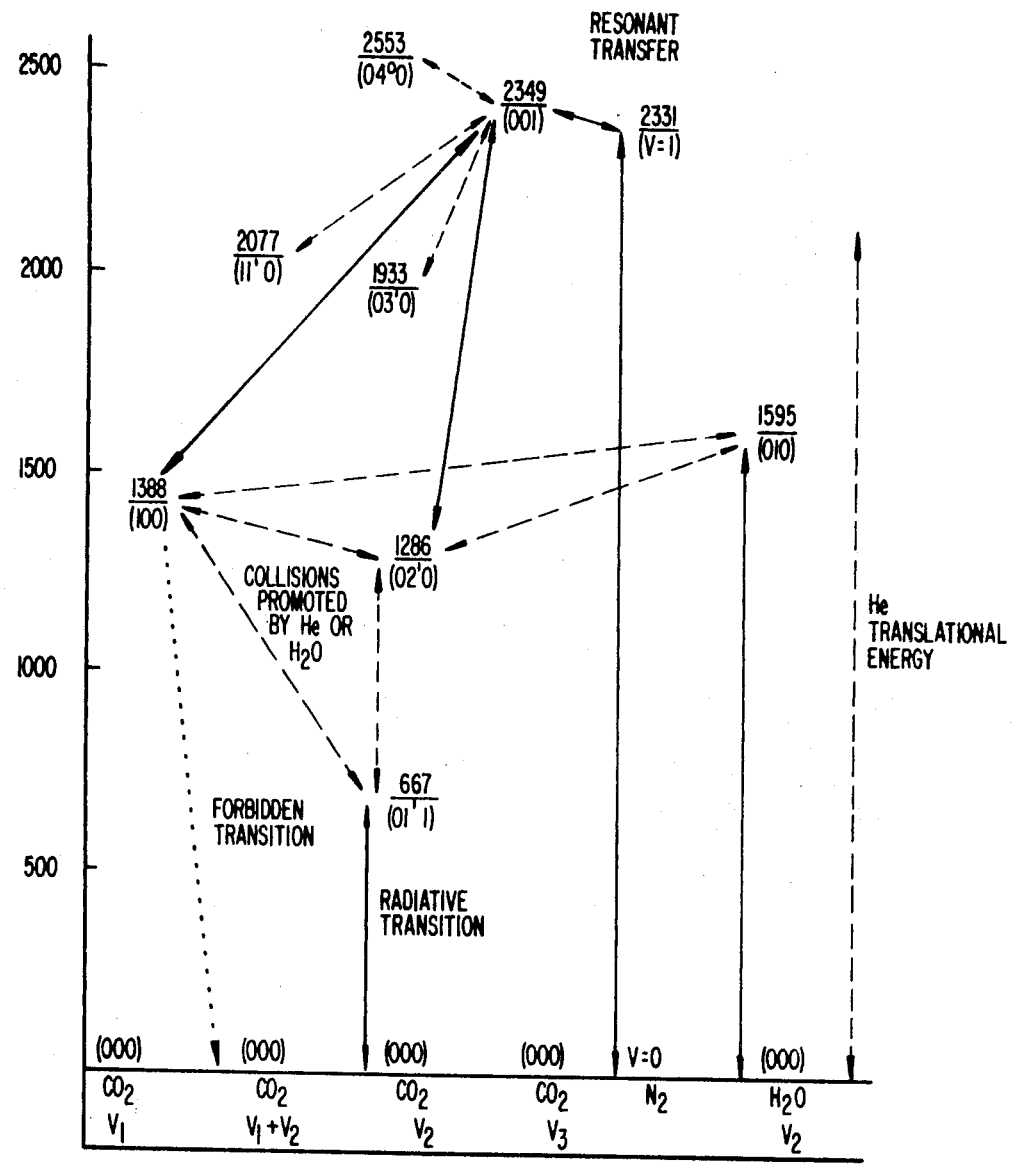
FIG. 2 is an energy diagram of a $CO_2$ laser illustrating the various transitions involved for the gases previously mentioned.
Figure 4:
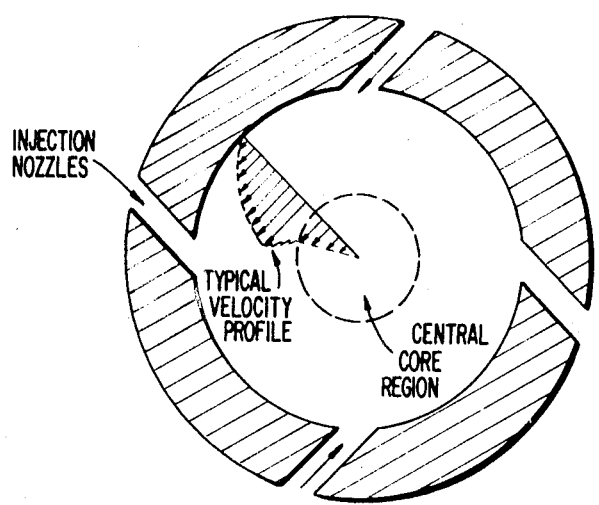
FIG. 4 is a diagrammatic view of the injection nozzles of a vortex tube showing a typical velocity profile.

Referring first to FIG. 3 for a description of the operation of a vortex tube which lends itself to use as a gas laser, it will be seen that the tube includes a straight elongated hollow cylindrical portion 10 which is open at each end. Gas is admitted under pressure tangentially in the tube creating a swirling flow. Such a swirl, or vortex, is the definitive characteristic of the above-named tube. It may be defined theoretically by stating that the largest vectorial component of velocity is circular in nature. In addition, there must exist to some degree of approximation in the central portion of the vortex a constant angular velocity. This means a solid-wheel rotation pattern in the core region. Kassner and Knoernschild have presented the most widely accepted theoretical description of the phenomenon occurring in a vortex tube (see R. Kassner and E. Knoernschild, "Friction Laws and Energy Transfer in Circular Flows;" U.S. Govt. Tech. Rpt., A.T.I. 31 130).

Positioned in the center part of the tube 10 is an enlarged hollow cylinder 12 having a series of nozzles 14. As disclosed in U.S. Pat. No. 1,952,281, whenever a gas is introduced into the nozzles 14 at high pressure and velocity, cool gas may be made to exit from one end of the tube 10 and hot gas from the opposite end. Such operation is obtained by preferentially permitting gas from the center of the tube to exit one end while permitting gas from the outer regions of cylinder 10 to exit the opposite end. From this evidence and from the theory of Kassner and Knoernschild, it may be determined that a radial temperature gradient exists within a vortex tube. It is this physical characteristic which permits the operation of a vortex tube as a laser. Since the requirements of the vortex tube laser do not involve separating the hot and cold gas flows into separate ends of the tube, the mechanism for so doing is omitted from the apparatus.

The pertinent results of the theory of a vortex tube as presented by Kassner and Knoernschild which have been verified by experimental investigations is given below.

Figure 5:
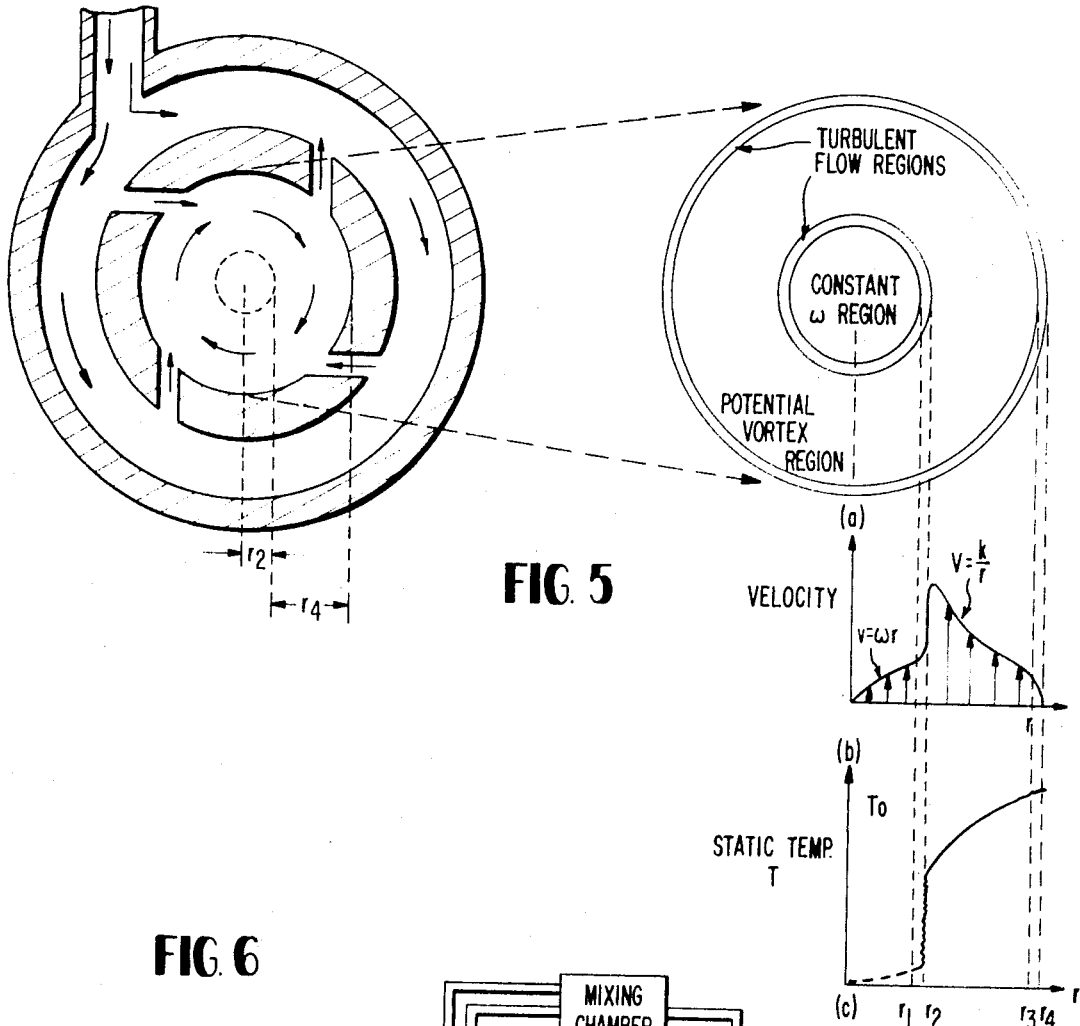
FIG. 5 is a combined diagrammatic view of the interior of a vortex tube keyed to a graph plotting the velocity and temperature conditions within the tube.

1. There exists a well-defined core region where the flow is laminar and of constant angular velocity. Constant angular velocity means that the tangential velocity in this region is directly proportional to $r$. The core region may, depending upon the various tube geometries and inlet pressures, vary in size from a small region along the axis of the tube up to and including almost all of the volume contained by the tube walls. Some typical temperature and pressure plots are shown in FIG. 5. 2. In the outer layers of the rotating mass of hot gases there exists a region whose temperature is higher than that of the core region and may even be higher than the temperature of the entering gas. The flow in this region is best described by stating that the tangential velocity $v$ is inversely proportional to $r$, the radial distance from the center of the vortex. Such a flow is also known as a potential vortex. Despite the fact that the flow is circular in a potential vortex, it actually is described as being irrotational wherein this term has the specific physical meaning that the velocity vector is derivable from the gradient of a scalar potential.

3. The entering gases undergo a radial free expansion as they enter the core region and are cooled as a result. Such expansion is unique in that it occurs along an "$r$" coordinate in an $r, \theta Z$ coordinate system.

4. The majority of the expansion and resultant cooling may occur along a narrow radial region which forms the boundaries between the two regions described in (1) and (2) above. The flow in this boundary region is highly turbulent and cannot be simply described. The narrowness of the transition zone means that the temperature drop may be quite rapid in radial distance and/or time. Calculations for the tube whose operational parameters are depicted in FIG. 5 yield a time of the order of a few milliseconds to achieve 60 percent of the temperature drop.

5. A centrifugal separation process may occur in the tube. Such a process has been the main practical application of the tube thus far wherein this principle is used for dust separation at the air intake of internal combustion engines operating in dirty environments. The feasibility of using the same principle for molecular separation has been demonstrated NASA Technical Note D–288; AD 241811).

In a vortex tube driven by the hot gases $CO_2$, $N_2$, $H_2O$/He, the difference between the smooth core region and the outer turbulent layers becomes even more marked. In the outer layers the gas is hot and is colliding with a hot wall. Since both pressure and temperature are quite high in this region and also because wall collisions are possible, thermal equilibrium obtains in this area. This means that the lower energy levels of all the gases involved are more densely populated than the higher levels. Due to the high temperature, however, the $N_2^=$ ($\nu=1$) level of $N_2$ may be well populated (as also are the higher levels of the other gases involved). Since this $N_2$ level is so long lived (order of seconds) the population distribution in this level would be solely governed by the temperature of the wall. Such a distribution would then correspond to a Boltzman distribution with the wall temperature (T) representing the vibrational temperature for this level. The following relation would then hold:

$$\frac{N_2^1}{N_2^0} \propto \exp\left(-1.44 \times \frac{\Omega_i}{T}\right)$$

In the above $N_2^1$ represents the number of atoms in the $N_2^=$ ($\nu=1$) excited state of nitrogen. $N_2^0$ is the number of nitrogen molecules in the ground state. $\Omega_i$ is the vibrational term level value in wave numbers. $T$ is the temperature of the wall in degrees Kelvin. A similar equation would describe the energy population distribution near the wall for the other gases involved. As each of the gases spiral into the center, different things occur depending upon the characteristics of the particular molecule involved. In $CO_2$, energy can be transferred between translational and rotational-vibrational degrees of freedom, and transitions from the rotational-vibrational levels to the ground state via an auxiliary gas are readily accomplished. Thus, the excited rotational-vibrational energy levels of $CO_2$ will be depopulated by direct transition, vibrational-translational energy exchange, and by auxiliary gas coupling from $H_2O$ or He. Nitrogen on the other hand is homonuclear molecule wherein, by the quantum selection rules, dipole transitions are strongly forbidden. This prevents deexcitation of the $N_2^=$ ($\nu=1$) state by either vibrational-translational energy coupling or by direct transition. Instead, the only effective means by which this excited state of nitrogen may be depopulated is through a collision process with $CO_2$. $N_2-N_2$ collisions produce no effective change in the population distribution. The only other possible means of this level being deexcited is through a wall collision, but, since the wall temperature is the same as the Boltzman temperature, no effective change in population distribution occurs upon such collision. Thus, if there were no $CO_2$ present, the vibrational temperature of the nitrogen throughout the tube would be at or near the value which it has at the outside wall. In the mixture then, as both gases spiral into the center and are cooled, a quenching or depopulating of the $N_2^=$ ($\nu=1$) level of nitrogen is provided by the $CO_2$, and is in fact the only effective means of depopulating this level. The total effect of the entire process is that the only net energy extraction from the first vibrational level of $N_2$ is provided by the upper laser level of $CO_2$ which means that a highly efficient energy transfer to the desired level is occurring.

Since the above highly favorable conditions for an efficient laser is obtained without recourse to a plasma discharge, it means that the pressure limitation resulting from a plasma discharge no longer need apply, and the pressure in the active laser region may be significantly increased, resulting in corresponding increases in the laser power output.

There exist three major methods of operation of a vortex tube laser. 1. Type I - Indirect heating (via a heat exchanger) of all the mixed gases together and subsequent injection of these hot, mixed gases into the vortex tube. 2. Type II - Indirect heating of only some of the gases and having separate injection nozzles into the vortex for the hot and cool gases. 3. Type III - Direct heating of all or some of the gases by means of a chemical reaction wherein the products of the reaction form some or all of the constituent gases of the laser.

In the following, the gases used are He, $CO_2$, $N_2$. $H_2O$ may also be used instead of He. In this case different flow ratios are required. The three gases are mixed upstream of the heat exchanger in a proportion which has been proven optional for laser operation. The exact optimal ratios depend on the operating parameters in a complex way and must be experimentally determined for each different system fabricated. The approximate partial flow ratios for He: $CO_2$:$N_2$ are 4:1:1.

Figure 6:
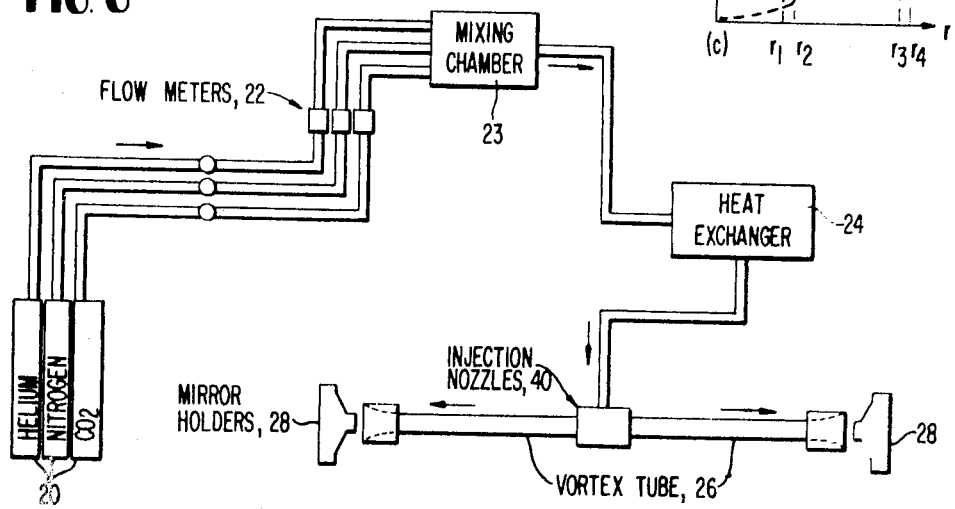
FIG. 6 is a diagrammatic flow scheme of type A operation of the vortex tube laser in accordance with the invention.

Referring to FIG. 6 for a description of Type I operation of the laser in accordance with the present invention, the gases from the cylinders 20 flow first to flow meters 22 and then to the mixing chamber 23 and then are heated in the heat exchanger 24 to a temperature over 1,000° K. The optimal temperature will depend on the pressure and flow capabilities of the system. In general, the higher the temperature achieved by the inlet gases, the higher the potential output of the laser (provided that the proper flow characteristics of the vortex are maintained). From the heat exchanger 24, the heated gases pass directly to the inlet nozzles of the vortex tube 26.

Mirrors mounted in mirror holders 28 are positioned at opposite ends of the tube 28, the mirrors being aligned so that the optical axis is colinear with the geometrical axis of tube 26.

Referring to FIG. 5, the feature of a vortex tube which makes it possible to use it as a $CO_2$ laser is illustrated. From the graph portions of this figure it will be seen that there is a rapid temperature decrease which occurs as the radially inward flow of gases traverses the turbulent boundary region between the outer region of potential vortex flow and the inner core region of constant momentum. The transit time of the $CO_2$ and $N_2$ molecules through this region has been determined to be of the order of a few milliseconds. This means that in the central core region of the vortex the $N_2^=$ ($\nu=1$) energy level of nitrogen will remain well populated and that the $CO_2$ energy levels will be depopulated. The result is that a population inversion for the $CO_2$ laser lines at about 10.6 microns will occur in the center of the vortex. A resonant optical path may be established in this region since the flow in the core is smoothly varying and laminar. With a population inversion existing in the core region and a clear optical path, a laser is then established by the installation and alignment of mirrors which have the proper reflectivity and optical flatness required for laser operation at 10.6 microns.

Figure 7:
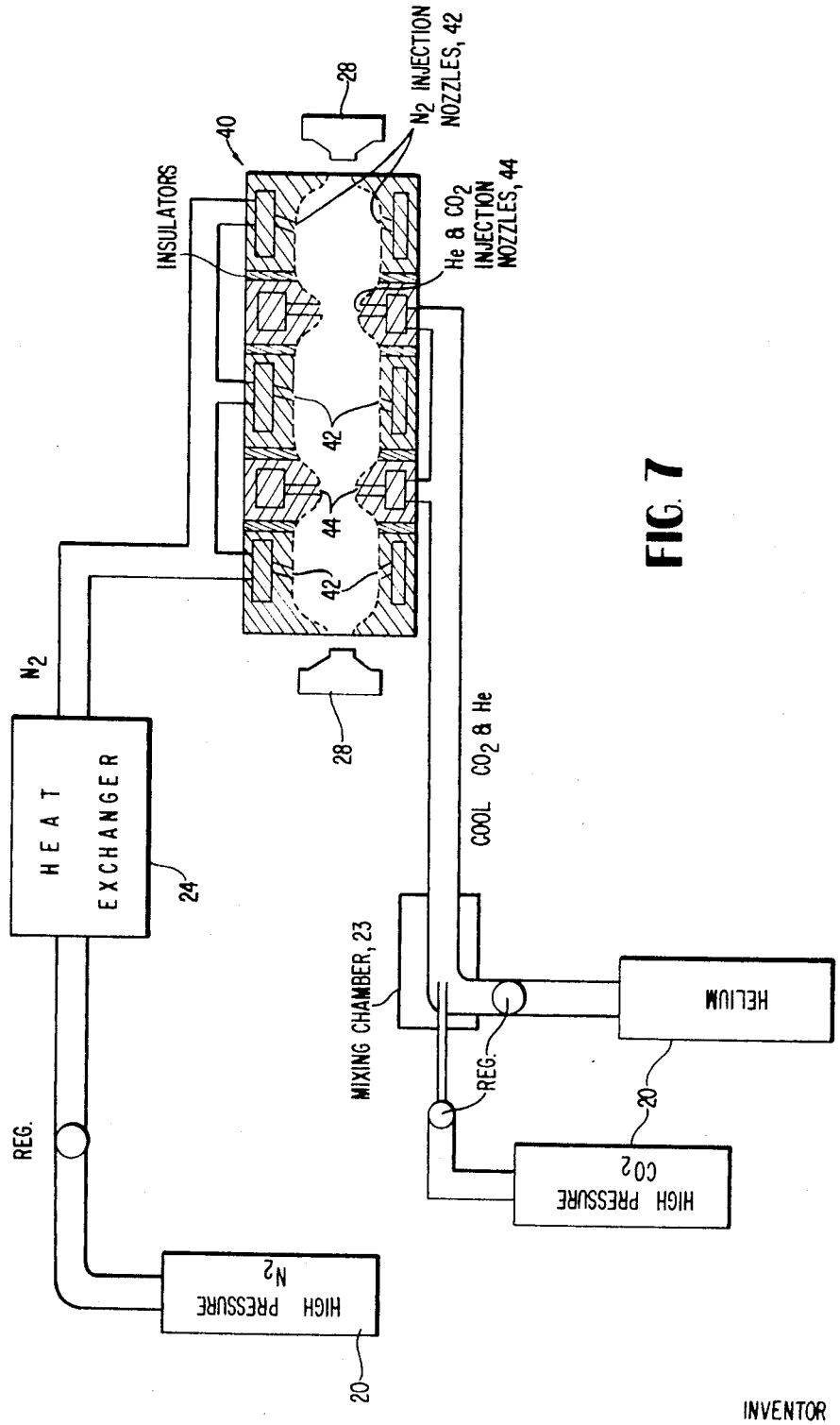
FIG. 7 is a view similar to FIG. 6 showing a type-B operation.

An alternative embodiment to the laser shown in FIG. 6 is illustrated in FIG. 7. The vortex tube 40 shown in this figure includes a plurality of axially spaced inlet nozzles 42 for separate injection of the nitrogen. Additional nozzles 44 axially spaced from each other are located between adjacent pairs of nozzles 42 and a mixture of carbon dioxide and helium is separately supplied to these nozzles.

With the embodiment shown in FIG. 7, only the nitrogen is introduced into the vortex tube at elevated temperatures. The hot nitrogen is used as the driving gas of the vortex and is injected through the nozzles 42 tangentially from the outermost walls of the tube. The cooler carbon dioxide and helium mixture is injected nearer the center of the vortex as is diagrammatically illustrated in this figure. In this embodiment, there is an advantage to be gained over the embodiment shown in FIG. 6 due to the fact that the carbon dioxide and/or the helium do not have to have their energy levels depopulated solely by the cooling action of the vortex since they are initially injected with all of their levels depopulated. In addition, insertion of these gases at a smaller radius of the vortex permits the driving pressure for these gases to be lower since the pressure at this point in the vortex is much lower.

The major disadvantage of this embodiment as compared to that shown in FIG. 6 is that the nitrogen must carry all of the heat into the vortex which means that there is a considerable reduction in the operational temperature which can be achieved in the vortex. Variations in the operation of this embodiment would include heating a carbon dioxide-nitrogen mixture and inserting cool helium or heating a helium-nitrogen mixture and inserting cool carbon dioxide.

A further method of operation is possible within the scope of the present invention. Such method would eliminate the separately heated heat exchanger and use instead the heat provided by a chemical reaction of the constituent gases reacting either in the vortex or prior to injection into the vortex. This would permit a compact energy source and gas source to be contained in one reservoir and would also permit the use of compressed air as a partial source of gas. Any contaminants or undesirable solid ash residue produced by the chemical reaction could be eliminated due to the centrifugal force in a vortex tube which would keep these products near the walls of the tube and out of the active optical region. Such products could then be exhausted by a separate exit in the same manner as swirl chambers which are used in dust separation.

From the foregoing it will be apparent to those skilled in this art that there is herein shown and disclosed new and useful improvements in the method and apparatus for achieving a laser. While particular embodiments have been herein shown and described, applicant claims the benefit of a full range of equivalents within the scope of the appended claims.

I claim:

1. A vortex tube laser amplifier comprising:
   an elongated hollow cylinder having a longitudinal axis and an opening at each end;
   inlet means connected to said cylinder for directing a mixture of gases having a temperature above 1,000° K. through a vortex-generating means positioned within said cylinder for receiving said mixture of gases and for creating a vortex of said mixture of gases in said cylinder, at least one of said gases in said mixture being an active laser medium.

heating means for heating said mixture of gases to a temperature of at least 1,000° K.;

pressure means for maintaining an inlet pressure high enough to generate and support a vortex, and a population inversion in said active laser medium;

and further means positioned along said axis for coupling optical radiation incident on said further means to said amplifier and for coupling radiation linearly related to said incident radiation from said amplifier.

2. A vortex tube laser oscillator comprising:

an elongated hollow cylinder having a longitudinal axis and an opening at each end;

inlet means connected to said cylinder for directing a mixture of gases having a temperature above 1,000° K. through a vortex-generating means positioned within said cylinder for receiving said mixture of gases and for creating a vortex of said mixture of gases in said cylinder, at least one of said gases in said mixture being an active laser medium;

heating means for heating said mixture of gases to a temperature of at least 1,000° K.;

pressure means for maintaining an inlet pressure high enough to generate and support a vortex, and a population inversion in said active laser medium; and an optical resonant cavity means positioned about and aligned with the longitudinal axis of said vortex tube for producing and for coupling from said tube stimulated emission of radiation from said active laser medium.

3. The combination defined by claim 2 in which said heating means is applied to said tube itself.

4. The combination defined by claim 2 in which said mixture of gases is such as to chemically react in the vortex to provide at least a part of the heat necessary to raise the temperature of said gases to 1,000° K.

5. The combination defined by claim 2 in which at least one of said mixture of gases is heated to a temperature of 1,000° K. and at least another of said gases is cooled prior to their entry into the inlet nozzles of said vortex tube.

6. The combination defined by claim 4 in which unwanted by products of the chemical reaction are withdrawn from the edges of the tube.

7. The combination defined by claim 1 in which said mixture of gases is selected from the group consisting of $CO_2$, $H_2O$, $N_2$ and He.

8. The combination defined by claim 2 in which said mixture of gases is selected from the group consisting of $CO_2$, $H_2O$, $N_2$ and He.

9. The combination defined by claim 2 in which the outer ends of said cylinder diverge outwardly to enhance an optically clear region for the laser cavity.

* * * * *